United States Patent [19]

Horisberger et al.

[11] 4,072,666

[45] Feb. 7, 1978

[54] ISOLATION OF CYSTOPLASMIC PROTEINS USING CHITOSAN

[75] Inventors: Marc Horisberger, Mont-Pelerin, Switzerland; Mats Olofsson, Astorp, Sweden

[73] Assignee: Societe d'Assistance Technique pour Produits Nestle S.A., Lausanne, Switzerland

[21] Appl. No.: 631,474

[22] Filed: Nov. 13, 1975

[30] Foreign Application Priority Data

Nov. 15, 1974 United Kingdom ............... 49494/74

[51] Int. Cl.$^2$ .............................................. A23J 1/14
[52] U.S. Cl. ................................................. 260/112 R
[58] Field of Search .................................... 260/112 R

[56] References Cited

U.S. PATENT DOCUMENTS

| | | | |
|---|---|---|---|
| 3,637,396 | 1/1971 | Hollo et al. | 260/112 X |
| 3,684,520 | 8/1972 | Bickoff et al. | 260/112 UX |
| 3,823,128 | 7/1974 | Bickoff et al. | 260/112 |
| 3,862,122 | 1/1975 | Penniston et al. | 260/112 X |
| 3,959,246 | 5/1976 | Bickoff et al. | 260/112 |

FOREIGN PATENT DOCUMENTS 1,015,764   9/1957   Germany.

OTHER PUBLICATIONS

Biochem. J. vol. 33, 1939, pp. 110–111, 121–122, Lugg.
J. Sci. Food Agric., July (12), 1961, Chayen et al., pp. 502–512.
Chem. Abstracts, vol. 54; 1960, 15759b, Zeile et al.
Chem. Abstracts, vol. 76, 1972, 98205n, Fujita.

*Primary Examiner*—Howard E. Schain
*Attorney, Agent, or Firm*—Watson, Leavenworth, Kelton & Taggart

[57] ABSTRACT

A process for isolating cytoplasmic proteins from aqueous vegetable materials containing chloroplastic and cytoplasmic proteins which comprises adding chitosan to the vegetable material to form a flocculate of the chloroplastic proteins and a supernatant, separating the flocculate and recovering a fraction containing cytoplasmic proteins from the supernatant.

8 Claims, No Drawings

ISOLATION OF CYSTOPLASMIC PROTEINS USING CHITOSAN

The present invention is concerned with the isolation of proteins.

Vegetable proteins may be obtained from two types of sources, which are the seeds and the leaves of various protein-containing plants. Whereas seed proteins, such as soya and peanut proteins for example, have found wide applications in the food industry, leaf proteins, which exist in association with green pigments (chlorophylls) are not utilised to any great extent, precisely on account of their colour. Whilst various methods exist for extracting uncoloured leaf proteins, none of these is fully satisfactory for application in industrial operations.

It has now been found that substantially uncoloured cytoplasmic proteins may be isolated from various aqueous vegetable protein materials by a particularly simple process involving selective flocculation of pigmented or chloroplastic proteins whilst leaving the desired cytoplasmic proteins in solution.

The present invention thus provides a process for isolating cytoplasmic proteins from aqueous vegetable materials containing chloroplastic and cytoplasmic proteins which comprises adding chitosan to the vegetable material to form a flocculate of chloroplastic proteins and a supernatant, separating the flocculate and recovering a fraction containing cytoplasmic proteins from the supernatant.

Chitosan is the poly - $\beta$ - (1→4) -2- amino -2- desoxy -D- glucose of formula $(C_6H_{11}NO_4)_n$, where $n$ is an integer greater than 1.

The vegetable starting material of the process is conveniently an aqueous liquid or juice obtained from a leaf protein source, the term "leaf" not being restricted to the actual leaves of a plant, but including other parts (stems, etc) containing both chloroplastic and cytoplasmic proteins, but excluding seeds. Typical examples of leaf protein sources are alfalfa (lucerne), beetroot tops and spinach. Other leaf protein sources include *Atriplex hortensis, Amaranthus caudatus, Chenopodium quinoa, Urtica dioica, Brassica napus, Brassica oleracea, Daitylis glomerata, Helianthus annuus* and *Vigna sinensis*. The juice or suspension may normally contain 2.5 to 10% by weight of dry matter which, in turn, usually has a crude protein content of 25 to 50% by weight.

Chitosan, being substantially insoluble in water, may be added to the aqueous protein material as a solution in a dilute acid. Various acids are suitable, both organic and inorganic, including acetic and hydrochloric acid. As the recovered protein is normally intended for human consumption, acetic acid is particularly preferred. The acid solution will generally contain 20 to 40 g of chitosan per liter; the pH of the solution is preferably within the range 5.0 to 5.5, so that the flocculation may take place at a pH of 5.0 to 6.0. Depending on the protein concentration of the aqueous vegetable material, an addition of chitosan corresponding to 0.02 to 0.15 g. per gram of total crude protein is satisfactory. For convenience, the amount of chitosan added is expressed as grams of chitosan per liter of protein material. As the chitosan is preferably added in acid solution, the natural pH of the aqueous vegetable material, which is normally between 5.7 and 6.1, will be modified. A relationship has been observed between the amount of total (cytoplasmic and chloroplastic) protein recovered and the pH of the protein material after addition of chitosan, and also a relationship between the pH and the amount of cytoplasmic fraction recoverable from the supernatant. Thus, whereas the total flocculable protein increases with decreasing pH, the amount of cytoplasmic protein decreases with decreasing pH. Accordingly, to obtain a reasonable balance between the yields of the two protein fractions, the pH of the protein material, after addition of chitosan, is preferable between 5.3 and 6.5 and desirably about 6.0.

Flocculation of the chloroplastic protein may be effected at temperatures below about 40°, for example at 10°–20° C, preferably with vigorous stirring during the addition of chitosan, followed by a settling period. The flocculate is most conveniently removed by centrifugation, but other physical methods of separation such as filtration and decanting may also be envisaged. The separated chloroplastic protein is particularly suitable for incorporation in animal feeds. The chitosan may be recovered by suspending the chloroplastic fraction in an aqueous medium at pH 4 to 5. On centrifugation of the suspension, the chitosan remains in solution in the supernatant and may be precipitated by adjusting the pH to a value above 7.

The supernatant obtained after separation of the flocculated chloroplastic protein may be treated in different ways to recover the soluble cytoplasmic protein. One particularly preferred procedure involves heating the supernatant to cause coagulation of the protein, which may then be recovered by the usual physical methods. Heating to about 80° C for about 2 minutes is particularly satisfactory. Cytoplasmic proteins which have not been denatured by heat may conveniently be recovered from the supernatant. Alternatively, the dissolved protein may be precipitated by adjusting the pH to a value of about 4.0. The recovered cytoplasmic protein may be washed and dried, giving a powder with a very faint yellowish colouration. It is suitable for incorporation in various foodstuffs and beverages.

The following Examples are given only for the purpose of illustrating the invention. The percentages are by weight.

EXAMPLE 1

A green juice is obtained by mincing and pressing a mixture of alfalfa (84%) and rye grass (16%), having a natural pH of 6.0 and containing 4.5% dry matter. To 1 liter of this juice are slowly added, at ambient temperature and with vigorous stirring, 67 ml/l of a 3% solution of chitosan in acetic acid having a pH of 5.0. A flocculate forms immediately, and when all the chitosan solution has been added, the juice has a pH of 5.5.

Stirring is continued for 5 minutes, and the suspension is then contrifuged to remove the flocculated chloroplastic proteins. The supernatant is heated at 80° C for 2 minutes, and the resulting precipitate of cytoplasmic proteins is recovered by centrifugation, washed and dried. 9 grams of a substantially colourless powder are thus obtained, having a protein content of around 80%.

It is particularly suitable for incorporation in foodstuffs.

EXAMPLE 2

The procedure described in Example 1 was repeated, with variations in chitosan addition and pH, on batches of alfalfa/rye grass juice, containing 5.0% dry matter (Experiments 2A–2D) and straight alfalfa juice containing 4.5% dry matter (Experiments 2E–2K). The results are summarised in Table 1.

Table 1

| Exp. No. | Chitosan addition g/l juice | pH of juice after addition of chitosan | Yield of cytoplasmic protein fraction g/l juice |
| --- | --- | --- | --- |
| 2A | 1.0 | 5.7 | 11.0 |
| 2B | 2.2 | 5.5 | 9.2 |
| 2C | 3.5 | 5.4 | 8.0 |
| 2D | 7.0 | 5.3 | 6.8 |
| 2E | 0.5 | 5.8 | 12.0 |
| 2F | 2.0 | 5.4 | 6.0 |
| 2G | 2.2 | 5.2 | 10.0 |
| 2H | 2.2 | 5.5 | 13.5 |
| 2I | 2.2 | 5.7 | 16.5 |
| 2J | 2.2 | 6.5 | 13.5 |
| 2K | 2.2 | 7.2 | 12.9 |

EXAMPLE 3

The procedure outlined in Example 1 is repeated with juice obtained from fresh spinach containing 25 g dry matter per liter. The results are summarized in Table 2.

Table 2

| Exp. No. | Chitosan addition g/l juice | pH of juice after addition of chitosan | Yield of cytoplasmic protein fraction g/l juice |
| --- | --- | --- | --- |
| 3A | 0.5 | 5.6 | 3.2 |
| 3B | 1.5 | 5.3 | 1.1 |
| 3C | 3.5 | 5.2 | 1.2 |
| 3D | 4.5 | 5.1 | 2.0 |

What we claim is:

1. A process for isolating cytoplasmic proteins from aqueous vegetable materials containing chloroplastic and cytoplasmic proteins which comprises adding chitosan to the vegetable material at a temperature of 10° to 20° C to form a flocculate of the chloroplastic proteins and a supernatant in which the cytoplasmic proteins are retained, separating the flocculate and separating a fraction containing the cytoplasmic proteins from the supernatant.

2. A process according to claim 1 in which the flocculate is formed at a pH of 5.3 to 6.5.

3. A process according to claim 2 in which the flocculate is formed at a pH of about 6.0.

4. A process according to claim 1 in which the amount of chitosan added corresponds to 0.02 to 0.15 grams per gram of crude protein present in the vegetable material.

5. A process according to claim 1 in which the chitosan is added in an acidic solution.

6. A process according to claim 1 in which the cytoplasmic proteins are recovered from the supernatant by heat coagulation.

7. A process according to claim 1 in which the cytoplasmic proteins are recovered from the supernatant by precipitation at a pH of about 4.0.

8. A process according to claim 1 in which the cytoplasmic proteins are recovered from the supernatant by ultrafiltration.